(12) United States Patent
Ogura et al.

(10) Patent No.: US 6,189,056 B1
(45) Date of Patent: Feb. 13, 2001

(54) INFORMATION PROCESSING TERMINAL

(75) Inventors: Akihiro Ogura, Sagamihara; Shigeru Yuzawa, Yamato, both of (JP)

(73) Assignee: International Business Machines Corporation, Armonk, NY (US)

(*) Notice: Under 35 U.S.C. 154(b), the term of this patent shall be extended for 0 days.

(21) Appl. No.: 09/081,344

(22) Filed: May 19, 1998

(30) Foreign Application Priority Data

May 20, 1997 (JP) .................................. 9-129709

(51) Int. Cl.[7] ...................................... G06F 13/14
(52) U.S. Cl. ...................... 710/62; 709/224; 709/236; 709/237
(58) Field of Search ................. 710/62, 72, 73; 709/224, 236, 237

(56) References Cited

U.S. PATENT DOCUMENTS

| | | | | |
|---|---|---|---|---|
| 5,373,149 | * | 12/1994 | Rasmussen | 235/492 |
| 5,515,305 | * | 5/1996 | Register et al. | 708/145 |
| 5,619,396 | * | 4/1997 | Gee et al. | 361/686 |
| 5,658,157 | * | 8/1997 | Koiwa et al. | 439/165 |
| 5,848,298 | * | 12/1998 | Steere, Jr. et al. | 710/62 |
| 5,878,282 | * | 3/1999 | Mital | 235/492 |
| 5,892,975 | * | 4/1999 | Barnes | 710/18 |
| 5,928,336 | * | 7/1999 | Takeuchi | 710/1 |
| 5,941,648 | * | 8/1999 | Robinson et al. | 400/82 |
| 5,978,591 | * | 11/1999 | Bartholomew et al. | 395/712 |
| 5,996,178 | * | 12/1999 | Murray | 16/303 |
| 6,011,699 | * | 1/2000 | Murray et al. | 361/814 |
| 6,015,092 | * | 1/2000 | Postlewaite et al. | 235/486 |
| 6,019,630 | * | 2/2000 | Alpert | 439/501 |
| 6,031,497 | * | 2/2000 | Nam | 343/702 |
| 6,052,735 | * | 4/2000 | Ulrich et al. | 709/236 |

OTHER PUBLICATIONS

IBM Technical Disclure Bulletin, Compact Personal Computer Memory Card Interface Association Keypad for Tablet Personal Computer,vol. 40 No. 2, Feb. 1997, pp. 59–60.*

* cited by examiner

Primary Examiner—Thomas C. Lee
Assistant Examiner—Abdelmoniem Elamin
(74) Attorney, Agent, or Firm—Louis P. Herzberg

(57) ABSTRACT

Providing an information processing terminal of a folded structure comprising a first housing portion having a form factor defined by PCMCIA and a second housing pivotally coupled to the first housing portion with an improved reliability of a cable passing through the coupling portion. The data processing part, which is a core part of the PDA function, is contained within the second housing portion which is not subject to restriction of shape and size. As a result, the first housing portion which has to conform to the PCMCIA/JEIDA specification may be relatively easily designed. For example, while the information processing apparatus is provided with a key input means in the first housing portion, it is possible to use a high function key board such as a keyboard of an excellent feel of key touch or a back lighted keyboard.

27 Claims, 6 Drawing Sheets

INFORMATION PROCESSING TERMINAL

FIELD OF THE INVENTION

This invention is directed to the field of information processing terminals. It is more specifically directed to detachably attached terminals used with an external computer system.

BACKGROUND OF THE INVENTION

This invention relates to an information processing terminal of the type detachably attached to an external computer system, such as a PC card and, particularly, to an information processing terminal having a housing of a form factor defined by PCMCIA (Personal Computer Memory Card International Association)/JEIDA (Japan Electronic Industry Development Association). More particularly, this invention relates to an information processing terminal of a foldable structure comprising a first housing of a form factor defined by PCMCIA/JEIDA and a second housing which is pivotally hinged relative to the first housing.

Various kinds of personal computers (PC) of a type including desk top, tower and notebook have been developed and brought into the market as a result of technological revolution in recent years. A PC is generally so designed as to permit a user to expand a peripheral environment.

Expansion of peripheral environment of a PC in the prior art has been done in many cases by mounting a desired "adapter card" into a "bus slot" provided in the PC. Examples of the adapter card include a video adapter, a communication (LAN) adapter and a SCSI (Small Computer System Interface) card, etc.

While mounting an adapter card is convenient and effective mainly in a desk top computer, it is not effective for a notebook computer which is not provided with many bus slots. In view of this, a "PC card" has been developed and brought into the market to augment the expandability of a notebook computer. A PC card is a kind of peripheral device designed in a size of a credit card (54.0 mm×85.6 mm). The expandability of notebook computers thus becomes easy by providing a card slot into which a PC card is inserted and electrically connected.

A housing of a cartridge type is adopted in the PC card, taking frequent attachment to and detachment from the PC into consideration. A guide line relating to the mechanical and electric specifications of PC cards are proposed mainly by PCMCIA (Personal Computer Memory Card International Association)/JEIDA (Japan Electronic Industry Development Association) and is a de facto standard. 3 kinds of PC cards are currently popular. They are Type-I of 3 mm thick, Type-II of 5.5 mm thick and Type-III of 10.5 mm thick. The Type-I is mainly used as a memory card. The Type-II is used for a facsimile/modem card, a LAN (token ring and Ethernet) card and a SCSI card while the Type-III is used as an integrated hard disk card.

Because a variety of line ups of PC cards has been recently available and the price has been lowered, a desk top computer as well as a notebook computer have been going to be provided with a PC card slot. The spread use of a PC card has been further encouraged since the US government declared in the summer of 1994 as a procurement criteria that every desk top computer should be equipped with a PC card slot.

As described in the above, it has been the general trend that the PC card is offered for use so as to be received in a card slot of a computer unit primarily for the purpose of augmenting the expandability of a notebook computer. However, the card has been polymorphic recently as the multi functionality of the PC card has been enhanced.

Figure 6:
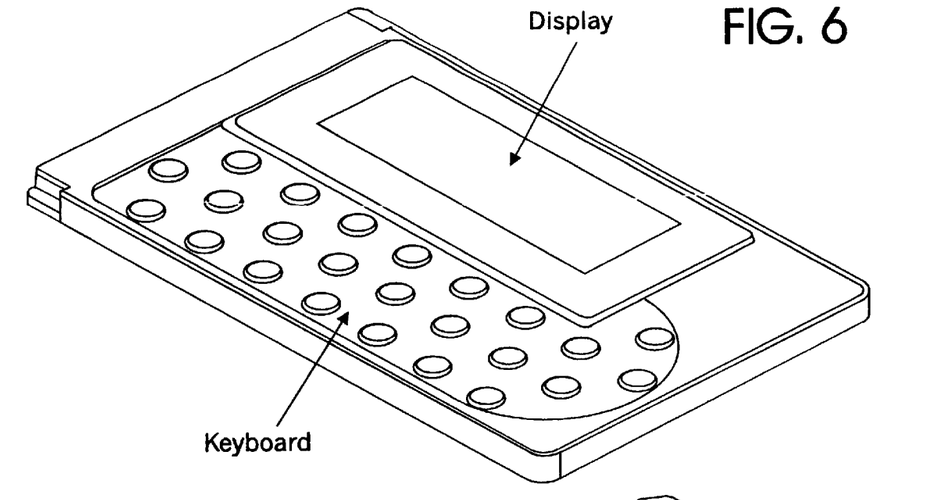
FIG. 6 shows the appearance of "IBM ChipCard TC-100", a PC card sold by IBM Japan.

For instance, "IBM ChipCard TC-100", a PC card sold by IBM Japan, (hereinafter simply referred to as "TC-100") is a new type of a PC card which is provided with a self running function (see FIG. 6). TC-100 integrates therein an 8-bit CPU (SMC88112 made by Seiko Epson) for controlling the internal operation installed beside a PCMCIA interface and a memory (SRAM and EEPROM) and is provided with a keyboard (24 keys) as an input means as well as a liquid crystal display (72×24 dots, STN monochrome) as an output means on the top surface of the card. TC-100 functions as a conventional memory card while it is inserted into the card slot of a PC. On the other hand, when the card is removed from the card slot, the sleeping CPU wakes up so that TC-100 can activate its self running function. If certain data is downloaded into the memory within the card while the card is inserted into the card slot of the PC, the downloaded data can be displayed on the display of TC-100 when the card is detached from the PC. The downloaded data may include a PIM (Personal Information Manager) data edited on the PC (such as a calendar, a schedule and an address book) and a text data in a Web page which is obtained from a Web server, etc. TC-100 is of the size of a business card and has a very high portability so that a PIM data and a Web page may be seen even in a mobile environment.

Figure 7:
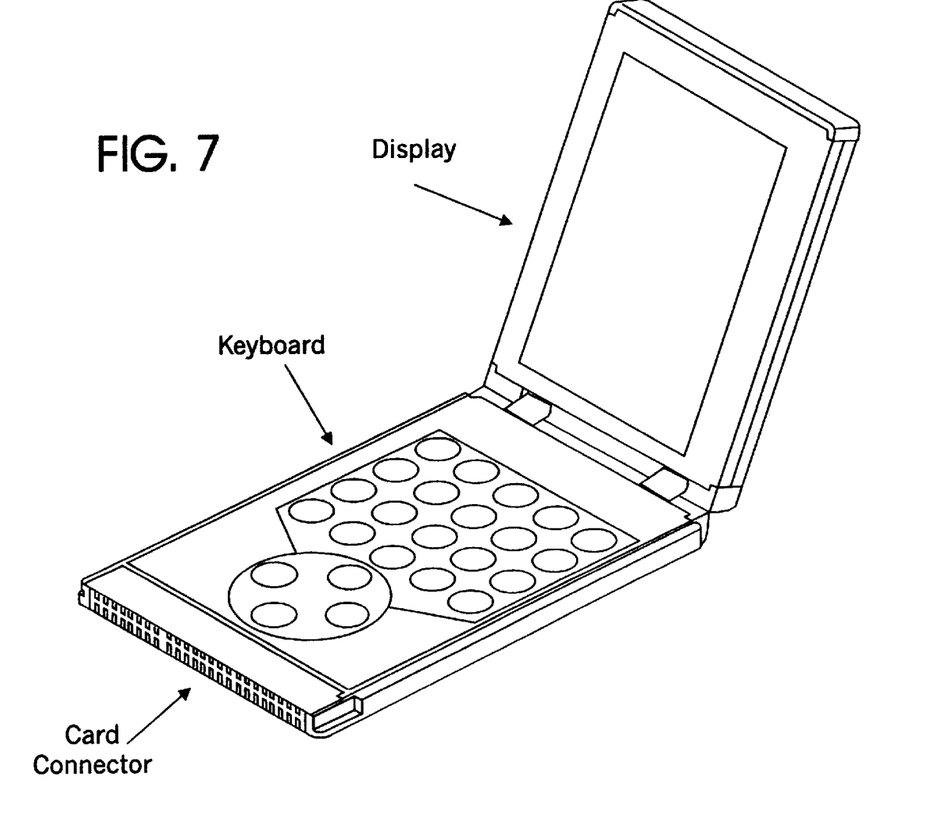
FIG. 7 shows the appearance of "IBM ChipCard VW-200", a PC card sold by IBM Japan.

"IBM ChipCard VW-200" PC card sold by IBM Japan (hereinafter simply referred to as "VW-200") employs a foldable structure comprising a first housing which conforms to the Type-II form factor of PCMCIA/JEIDA and a second housing which is pivotally hinged on one edge of the first housing (see FIG. 7). VW-200 is provided with a self running function similar to TC-100. Namely, it is used as a memory card when it is inserted into the card slot of the PC while it behaves as a PDA (Personal Digital Assistant) under the control of the internal CPU when it is removed from the card slot. A PCMCIA connector is provided on the other edge of the first housing for electrical connection to the card slot of the PC. When VW-200 is unfolded, it can be inserted to the card slot as a Type-II card while it is inserted into the card slot as a Type-III card when it is folded. The majority of the top surface of the first housing is allocated to a key input area where the number of keys is more than TC-100 and the key top is larger allowing an easy input manipulation by a user. A relatively large liquid crystal display (STN monochrome) of 200×320 dots resolution is provided on the surface of the second housing to enhance the display capability over TC-100. A Kanji ROM is also integrated therein to support Kanji display function (16 dots font, double sized 12 characters×20 lines).

Figure 8:
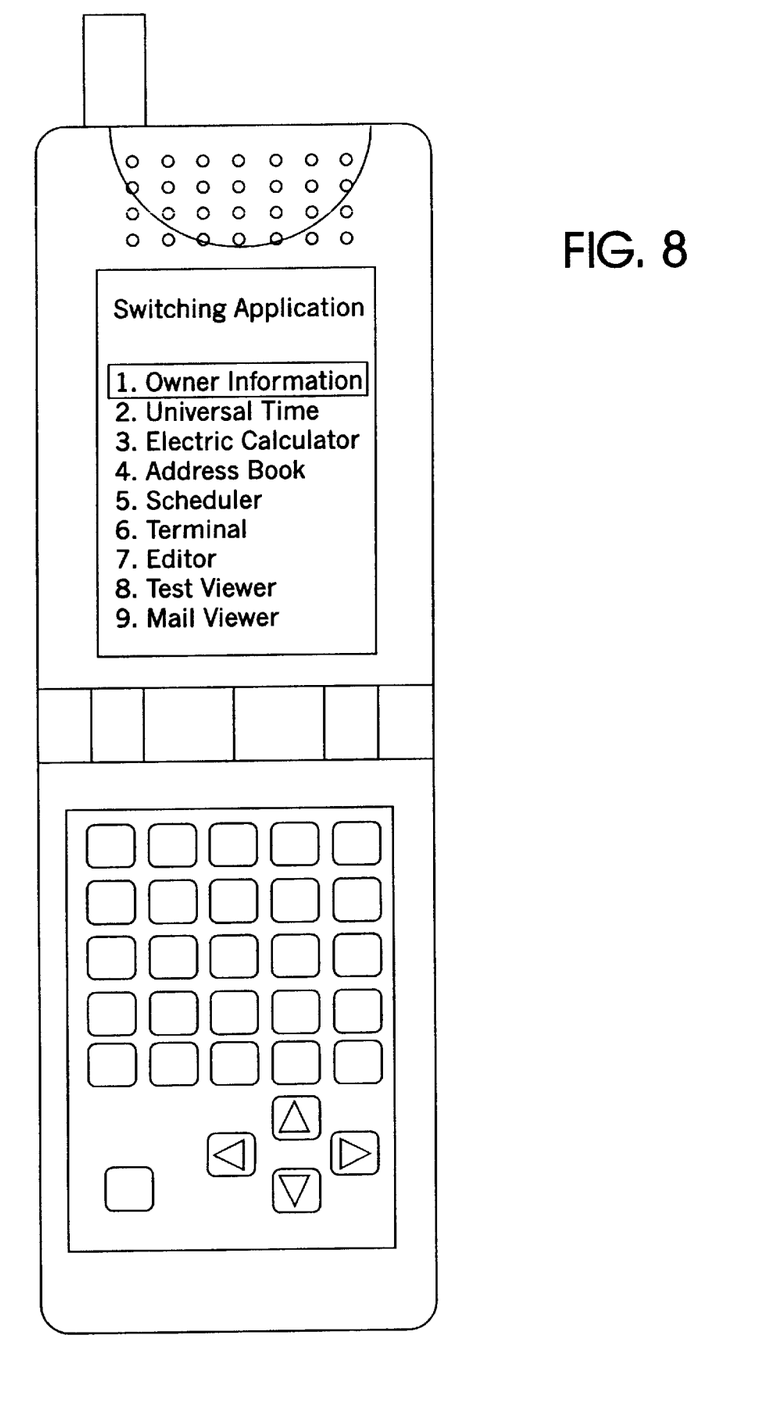
FIG. 8 shows the appearance of "DataScope-110", a PC card sold by Kyocera.

"DataScope-110", a PHS (Personal Handyphone System) telephone, which was developed by Kyocera jointly with IBM Japan (hereinafter simply refereed to as "DS-110", see FIG. 8) is provided with a PDA function beside a PHS function/wireless modem card function. The first housing of DS-110 conforms to the Type-II of PCMCIA/JEIDA and has a PCMCIA connector on one edge and a keyboard on the top surface. The second housing is hinged on the other end of the first housing. A relatively large liquid crystal display (STN monochrome) of 200×320 dots resolution is provided on the surface of the second housing. The PDA and PHS parts are each provided with an independent processor unit and memory (RAM and ROM) so that they can operate in parallel to perform a complex processing. The PDA part is provided with a flash memory (1MB), RAM (128KB) and a Kanji font ROM (2MB) in addition to a 16-bit CPU "TLCS-9001" made by Toshiba. The PHS part is provided with an antenna and an RF circuit for wireless communication and a wireless data processing circuit in addition to a data processing CPU and a memory. These components for wireless communication are each mounted within the second housing which is relatively thick and is not inserted into the card slot because of the size and a reception sensitivity. According to "PIAFS" (PHS Internet Access Forum Standard), a PHS public data communication service which is to start in April 1997, 32 Kbps data communication is supported so that an access from PHS to the Internet is feasible. For example, by installing a PIAFS compatible software in DS-110, an electronic mail may be exchanged even in a mobile environment. In addition, data received in the PHS part can be processed in the PDA part to display the process result on the display.

SUMMARY OF THE INVENTION

The present invention overcomes a restriction in the number and the size of components which can be contained inside the first housing which must conform to a particular form factor, such as the PCMCIA/JEIDA form factor, with regard to a computer card of a foldable structure such as VW-200 and DS-110.

For example, it is indispensable for a keyboard to be provided as an input device of the PDA function in the first housing (because the surface of the second housing is already occupied with the display). It is very difficult to limit the thickness of the first housing within a dimension conforming to the Type-II (5 mm) when arithmetic processing components (a CPU and a memory, etc.) for processing PCMCIA bus transaction are also integrated in the first housing (it is a normal practice to mount a keypad on the front surface and other components on the back of a PCB). For instance, a keyboard of a high function type such as a keyboard having an excellent touch feel or a back-lighted keyboard is relatively too thick to be incorporated into the first housing.

It is preferable for the PDA function implementing components to be contained in the second housing rather than the first housing in order to assure the operability of the keyboard. This is because there is no need for the second housing to conform to the form factor defined by PCMCIA/JEIDA. In other words, there is no restriction of the size and the shape. On the other hand, it is necessary for the PDA function part to handle a PCMCIA bus transaction which is received through the PCMCIA connector so that it has to be interconnected to the PCMCIA bus. Therefore, if the PDA function part is placed in the second housing, the PCMCIA bus would have to be extended to the second housing through the hinge coupling.

PCMCIA/JEIDA defines 68 connector pins. If a cable consisting of 68 signal lines is passed through the hinge coupling that is a movable part of relatively small size, the cable would be subject to a stress upon each opening and closure. An accumulated stress would result in a luck of reliability such as an interruption of the lines.

It is an aspect of this invention to provide an improved information processing terminal comprising a housing of a form factor defined by PCMCIA/JEIDA.

It is another aspect of this invention to provide an improved information processing terminal comprising a first housing having a form factor defined by PCMCIA/JEIDA and a second housing which need not conform to the form factor.

It is a further aspect of this invention to provide an improved information processing terminal comprising a first housing having a form factor defined by PCMCIA/JEIDA and a second housing pivotally coupled to the first housing.

It is a still further aspect of this invention to provide an improved information processing terminal comprising a first housing having a form factor defined by PCMCIA/JEIDA and a second housing pivotally coupled to the first housing wherein the reliability of the cable passing through the portion coupling the two housing is enhanced.

It is a still further aspect of this invention to provide an improved information processing terminal comprising a first housing having a form factor defined by PCMCIA/JEIDA and a second housing pivotally coupled to the first housing wherein a high function keyboard may be mounted on the first housing.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

This invention overcomes a severe restriction in the number and the size of components which can be contained inside the first housing which must conform to the PCMCIA/JEIDA form factor with regard to a PC card of a foldable structure such as VW-200 and DS-110.

For example, it is indispensable for a keyboard to be provided as an input device of the PDA function in the first housing (because the surface of the second housing is already occupied with the display). It is very difficult to limit the thickness of the first housing within a dimension conforming to the Type-II (5 mm) when arithmetic processing components (a CPU and a memory, etc.) for processing PCMCIA bus transaction are also integrated in the first housing (it is a normal practice to mount a keypad on the front surface and other components on the back of a PCB). For instance, a keyboard of a high function type such as a keyboard having an excellent touch feel or a back-lighted keyboard is relatively too thick to be incorporated into the first housing.

It is preferable for the PDA function implementing components to be contained in the second housing rather than the first housing in order to assure the operability of the keyboard. This is because there is no need for the second housing to conform to the form factor defined by PCMCIA/JEIDA. In other words, there is no restriction of the size and the shape. On the other hand, it is necessary for the PDA function part to handle a PCMCIA bus transaction which is received through the PCMCIA connector so that it has to be interconnected to the PCMCIA bus. Therefore, if the PDA function part is placed in the second housing, the PCMCIA bus would have to be extended to the second housing through the hinge coupling.

PCMCIA/JEIDA defines 68 connector pins. If a cable consisting of 68 signal lines is passed through the hinge coupling that is a movable part of relatively small size, the cable would be subject to a stress upon each opening and closure. An accumulated stress would result in a luck of reliability such as an interruption of the lines.

It is an object of this invention to provide an improved information processing terminal comprising a housing of a form factor defined by PCMCIA/JEIDA.

It is another object of this invention to provide an improved information processing terminal comprising a first housing having a form factor defined by PCMCIA/JEIDA and a second housing which need not conform to the form factor.

It is a further object of this invention to provide an improved information processing terminal comprising a first housing having a form factor defined by PCMCIA/JEIDA and a second housing pivotally coupled to the first housing.

It is a still further object of this invention to provide an improved information processing terminal comprising a first housing having a form factor defined by PCMCIA/JEIDA and a second housing pivotally coupled to the first housing wherein the reliability of the cable passing through the portion coupling the two housing is enhanced.

It is a still further object of this invention to provide an improved information processing terminal comprising a first housing having a form factor defined by PCMCIA/JEIDA and a second housing pivotally coupled to the first housing wherein a high function keyboard may be mounted on the first housing.

In view of the above, the first aspect of this invention is an information processing terminal detachably attached to an external computer system comprises: a first housing member attachable to a recessed connecting portion of the external computer system; a second housing member pivotally hinged on one end of the first housing member; a key input means contained within the first housing member; a data processing part contained within the second housing member; a display means provided within the second housing member; and a transmission means for transmitting a signal between the first and the second housings.

The second aspect of this invention is an information processing terminal which is detachably attached to an external computer system comprises: a first housing member attachable to a recessed connecting portion of the external computer system; a bus connector part provided on one end of the first housing member for electrical connection to the recessed connecting portion; a second housing member pivotally hinged on the other end of said first housing member; a key input means contained within the first housing member; a data processing part contained within the second housing member; a display means provided within the second housing member; and a transmission means for electrically connecting the first and the second housing members in a form different from the bus connector part.

The third aspect of this invention is an information processing terminal detachably attached to an external computer system comprises; a first housing member attachable to a recessed connecting portion of the external computer system; a bus connector part provided on one end of the first housing member for electrical connection to the recessed connecting portion; a second housing member pivotally hinged on the other end of the first housing member; a key input means contained within the first housing member; a data processing part contained within the second housing member; a display means provided within the second housing member; a transmission means for electrically connecting the first and the second housing members in a form different from the bus connector part, a wireless communication means contained in the second housing; and an antenna attached to the second housing member.

The fourth aspect of this invention is an information processing terminal detachably attached to an external computer system comprises: a first housing member having a form factor defined by PCMCIA/JEIDA; a PCMCIA connector provided on one end of the first housing member; a second housing member pivotally hinged on the other end of the first housing member; a transmission means for transmitting a signal between the first and the second housing members; and a data processing part contained within the second housing member for processing data exchanged through the transmission means.

The fifth aspect of this invention is an information processing terminal detachably attached to an external computer system comprises: a first housing member having a form factor defined by PCMCIA/JEIDA; a PCMCIA connector provided on one end of the first housing member for sending and receiving a PCMCIA bus signal in a form not multiplexing each bus signal line; a second housing member pivotally hinged on the other end of the first housing member; a PCMCIA interface contained within the first housing member having a multiplexing circuit for generating a bus into which at least a part of bus signal lines of the PCMCIA bus are multiplexed; a cable for transmitting between the first and the second housing members the bus into which at least a part of bus signal lines are multiplexed; and a data processing part contained within the second housing member for processing data exchanged through the cable.

The sixth aspect of this invention is an information processing terminal detachably attached to an external computer system comprises: a first housing member having a form factor defined by PCMCIA/JEIDA; a PCMCIA connector provided within one end of the first housing member for sending and receiving a PCMCIA bus signal in a form not multiplexing each bus signal line; a second housing member pivotally hinged on the other end of the first housing member; a PCMCIA interface contained within the first housing member having a multiplexing circuit for generating a bus into which at least a part of bus signal lines of the PCMCIA bus are multiplexed; a cable for transmitting between the first and the second housing members the bus into which at least a part of bus signal lines are multiplexed; a key input means provided within the top surface of the first housing member; a data processing part contained within the first housing member for processing data exchanged through the cable; and a display provided in the front surface of the second housing for displaying processed data.

The seventh aspect of this invention is an information processing terminal detachably attached to an external computer system comprises: a first housing member having a form factor defined by PCMCIA/JEIDA; a PCMCIA connector provided on one end of the first housing member for sending and receiving a PCMCIA bus signal in a form not multiplexing each bus signal line, a second housing member pivotally hinged on the other end of the first housing member, a PCMCIA interface contained within the first housing member having a multiplexing circuit for generating a bus into which at least a part of bus signal lines of the PCMCIA bus are multiplexed; a key input means provided on the top surface of the first housing member; a key input control circuit contained within the first housing member for generating a scan code in response to a key input operation by the key input means; a cable for electrically connecting the first and the second housing members; a signal switching means contained within the first housing for selectively transmitting either one of the multiplexed bus signal and the scan code signal; a data processing part contained within the second housing member for processing data exchanged through the cable; and a display provided on the front surface of the second housing for displaying processed data.

The eighth aspect of this invention is an information processing terminal detachably attached to an external computer system comprises: a first housing member having a form factor defined by PCMCIA/JEIDA; a PCMCIA connector provided on one end of the first housing member for sending and receiving a PCMCIA bus signal in a form not multiplexing each bus signal line; a second housing member pivotally hinged on the other end of the first housing member; a PCMCIA interface contained within the first housing member having a multiplexing circuit for generating a bus into which at least a part of bus signal lines of the PCMCIA bus are multiplexed; a key input means provided on the top surface of the first housing member; a key input control circuit contained within the first housing member for generating a scan code in response to a key input operation by the key input means; a cable for electrically connecting the first and the second housing members; an attachment/detachment detection means for detecting whether or not the PCMCIA connector is electrically connected to an external computer system; a signal switching means for transmitting the multiplexed bus to the cable in response to the PCMCIA connector being connected to an external computer system and for transmitting the scan code signal in response to the PCMCIA connector not being connected to any external computer system over the cable; a data processing part contained within the second housing member for processing data exchanged through the cable; and a display provided on the front surface of the second housing member for displaying processed data.

In the information processing terminal of the fourth to eighth aspects of this invention, the data processing part shall include a processor unit for arithmetic processing of data and a memory for storing a program and data.

In the information processing terminal of the fifth to eighth aspects of this invention, the multiplexing circuit may multiplex the address bus and the data bus of the PCMCIA bus.

In the information processing terminal of the fifth to eighth aspects of this invention, the PCMCIA interface may contain an address decoder for converting the address bus in the PCMCIA bus to such a bit width that may be able to address the memory space in the data processing part.

In the information processing terminal of the fifth to eighth aspects of this invention, the second housing member may have an index for correlating the address specified on the PCMCIA bus to the address on the memory space in the data processing part.

In the information processing terminal of the fifth to eighth aspects of this invention, the PCMCIA interface may contain an attribute memory for storing an attribute information as a PC card.

In the information processing terminal of the fifth to eighth aspects of this invention, a wireless communication means may be integrated in the second housing member.

The ninth aspect of this invention is an information processing terminal detachably attached to an external computer system comprises: a first housing member attachable to a recessed connecting portion of the external computer system; a second housing electrically connected to the first housing member; a key input means contained within the first housing member; a data processing part contained within the second housing member; a display means provided within the second housing member; and a transmission means for transmitting a signal between the first and the second housing members.

The tenth aspect of this invention is an information processing terminal detachably attached to an external computer system comprises: a first housing member attachable to a recessed connecting portion of the external computer system; a bus connector part provided on one end of the first housing member for electrical connection to the recessed connecting portion; a second housing member electrically connected to the first housing member, a key input means contained within the first housing member; a data processing part contained within the second housing member; a display means provided within the second housing member; and a transmission means for electrically connecting the first and the second housing members in a form different from the bus connector part.

The eleventh aspect of this invention is an information processing terminal detachably attached to an external computer system comprises: a first housing member attachable to a recessed connecting portion of the external computer system, a bus connector part provided on one end of the first housing member for electrical connection to the recessed connecting portion; a second housing member electrically connected to the first housing member; a key input means contained within the first housing member; a data processing part contained within the second housing member; a display means provided within the second housing member; a transmission means for electrically connecting the first and the second housing members in a form different from the bus connector part; a wireless communication means contained within the second housing member; and an antenna attached to the second housing member.

The twelfth aspect of this invention is an information processing terminal detachably attached to an external computer system comprises: a first housing member having a form factor defined by PCMCIA/JEIDA; a PCMCIA connector provided on one end of the first housing member; a second housing member electrically connected to the first housing member; a transmission means for transmitting a signal between the first and the second housing members; and a data processing part contained within the second housing member for processing data exchanged through the transmission means.

The thirteenth aspect of this invention is an information processing terminal detachably attached to an external computer system comprises: a first housing member having a form factor defined by PCMCIA/JEIDA; a PCMCIA connector provided on one end of the first housing member for sending and receiving a PCMCIA bus signal in a form not multiplexing each bus signal line; a second housing member electrically connected to the first housing member; a PCMCIA interface contained within the first housing member having a multiplexing circuit for generating a bus into which at least a part of bus signal lines of the PCMCIA bus are multiplexed; a cable for transmitting between the first and the second housing members the bus into which at least a part of bus signal lines are multiplexed; and a data processing part contained within the second housing member for processing data exchanged through the cable.

The fourteenth aspect of this invention is an information processing terminal detachably attached to an external computer system comprises: a first housing member having a form factor defined by PCMCIA/JEIDA; a PCMCIA connector provided on one end of the first housing member for sending and receiving a PCMCIA bus signal in a form not multiplexing each bus signal line; a second housing member electrically connected to the first housing member; a PCMCIA interface contained within the first housing member having a multiplexing circuit for generating a bus into which at least a part of bus signal lines of the PCMCIA bus are multiplexed; a cable for transmitting between the first and the second housing members the bus into which at least a part of bus signal lines are multiplexed; a key input means provided on the top surface of the first housing member; a data processing part contained within the first housing member for processing data exchanged through the cable; and a display provided on the front surface of the second housing member for displaying processed data.

The fifteenth aspect of this invention is an information processing terminal detachably attached to an external computer system comprises: a first housing member having a form factor defined by PCMCIA/JEIDA; a PCMCIA connector provided on one end of the first housing member for sending and receiving a PCMCIA bus signal in a form not multiplexing each bus signal line; a second housing member electrically connected to the first housing member; a PCMCIA interface contained within the first housing member having a multiplexing circuit for generating a bus into which at least a part of bus signal lines of the PCMCIA bus are multiplexed; a key input means provided on the top surface of the first housing member; a key input control circuit contained within the first housing member for generating a scan code in response to a key input operation by the key input means; a cable for electrically connecting the first and the second housing members; a signal switching means contained within the first housing member for selectively transmitting either one of the multiplexed bus signal and the scan code signal; a data processing part contained within the second housing for processing data exchanged through the cable; and a display provided on the front surface of the second housing member for displaying processed data.

The sixteenth aspect of this invention is an information processing terminal detachably attached to an external computer system comprises: a first housing member having a form factor defined by PCMCIA/JEIDA; a PCMCIA connector provided on one end of the first housing member for sending and receiving a PCMCIA bus signal in a form not multiplexing each bus signal line; a second housing member electrically connected to the first housing; a PCMCIA interface contained within the first housing member having a multiplexing circuit for generating a bus into which at least a part of bus signal lines of the PCMCIA bus are multiplexed; a key input means provided on the top surface of the first housing member; a key input control circuit contained within the first housing member for generating a scan code in response to a key input operation by the key input means; a cable for electrically connecting the first and the second housing members; an attachment/detachment detection means for detecting whether or not the PCMCIA connector is electrically connected to an external computer system; a signal switching means for transmitting the multiplexed bus to the cable in response to the PCMCIA connector being connected to an external computer system and for transmitting the scan code signal in response to the PCMCIA connector not being connected to any external computer system over the cable; a data processing part contained within the second housing member for processing data exchanged through the cable; and a display provided on the front surface of the second housing member for displaying processed data.

The information processing terminal of each aspect of this invention comprises a first housing member and a second housing member which is pivotally hinged on one end thereof. The second housing member may be opened and closed with respect to the first housing.

The information processing terminal of the first to the sixteenth aspects of this invention are each contained in the second housing member which is not subject to the restriction of the size and the shape. As a result, the first housing member is relatively easily designed so as to meet the specification defined by PCMCIA/JEIDA. For instance, the information processing terminal of the third to the fifth aspects which is provided with a key input means in the first housing member may be equipped with a thick high function keyboard such as a keyboard of excellent feel of key touch and a back-lighted keyboard.

In the information processing terminal of the fifth to the eighth or the thirteenth to the sixteenth aspects of this invention, the PCMCIA interface is adapted to send to the second housing member the address bus and the data bus of the PCMCIA bus signal which are exchanged with the external computer system and multiplexed together. It is thus feasible to reduce the number of signal lines of the cable which passes through the hinge portion coupling the first housing member with the second housing member. As a result of reduced number of signal lines, the reliability is improved as the danger of the stress to which the cable is subject and an interruption of the signal lines upon opening and closure of the terminal are reduced.

In the information processing terminal of the seventh to the eighth or the fifteenth to the sixteenth aspects of this invention, the cable for connecting the first housing member to the second housing member is adapted to selectively transmit either one of PCMCIA bus signal in which the address bus and the data bus are multiplexed together and the scan code signal generated by the key input means. In these aspects also, it can be said that the number of signal lines passing through the hinge portion coupling the two housing members is saved so that the reliability is improved as the danger of the stress to which the cable is subject and an interruption of the signal lines upon opening and closure of the terminal are reduced.

The key input means is not used generally when it is attached to the external computer system (for example, if the first housing is the PCMCIA card, the key input operation is inherently disabled when it is inserted in the card slot). Therefore, the attachment to or detachment from the external computer system may be automatically detected to determine which of the multiplexed PCMCIA bus signal and the scan code signal is to be transmitted over the cable depending on the result of the detection as done in the information processing terminal of the fifth aspect.

Incidentally, the PC card conforming to the PCMCIA/JEIDA specification is obliged to have an attribute memory for storing the attribute information of the card and a configuration register for enabling the external computer system with a card attached thereto to get an access. These memory and register are of a nature in which they are accessed solely by the external computer system and do not virtually contribute or do not contribute at all to the internal operation of the information processing terminal (e.g., PDA function and PHS function). It is therefore preferable to place the attribute memory and the configuration register in the first housing member which is relatively easily accessed by the external compute system.

Other objects as well as the features and advantages of the invention will be apparent from the embodiments of this invention and the detailed description based on the accompanying drawings.

An embodiment of this invention will now be described in detail with reference to the drawings.

Figure 1:
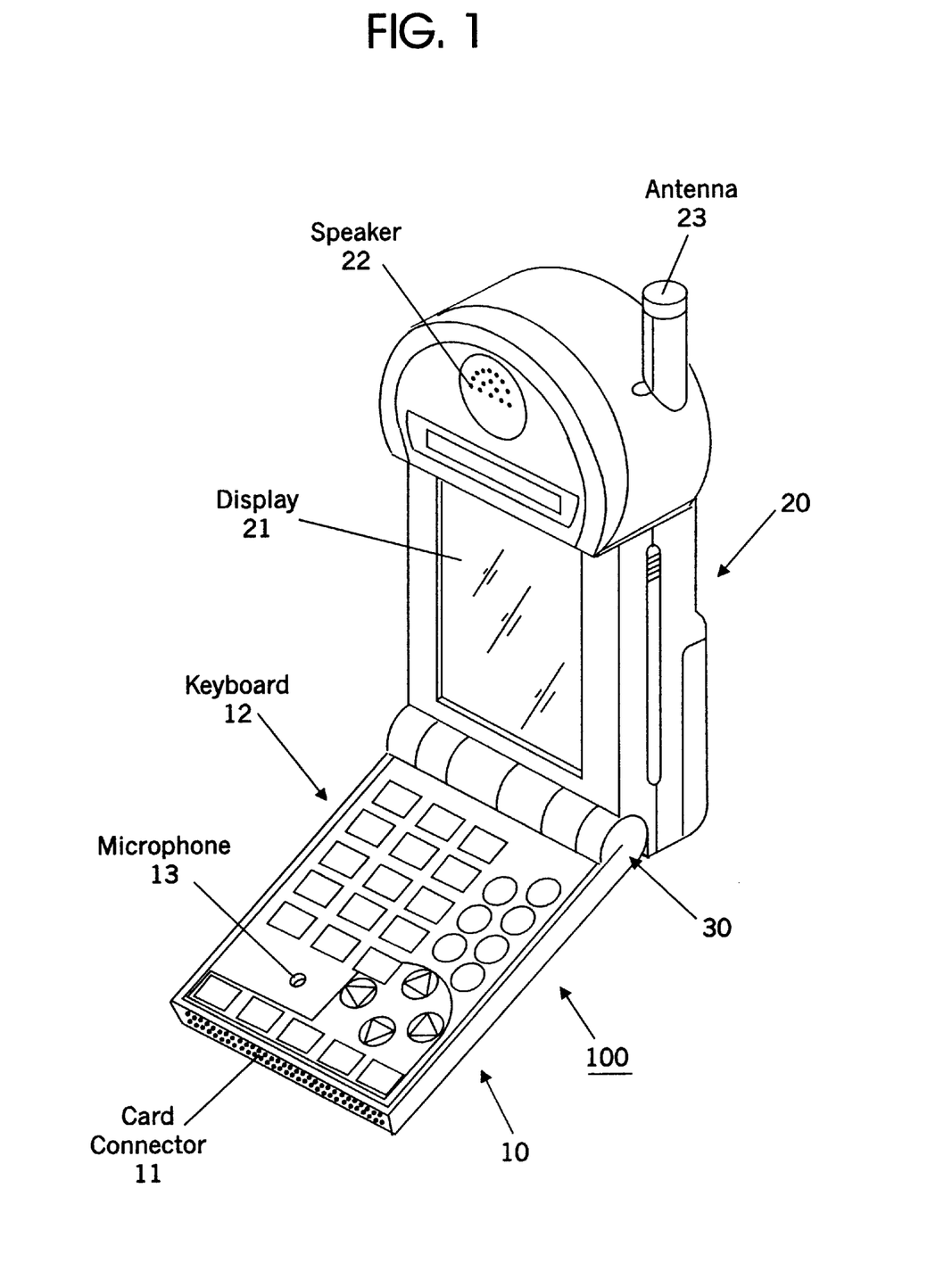
FIG. 1 shows the appearance of the information processing terminal 100 of a foldable structure embodying this invention.

FIG. 1 illustrates an example appearance of an information processing terminal 100 which is suitable to implement this invention. It should be understood that the information processing terminal 100 is provided with both a PDA (Personal Digital Assistant) function and a wireless communication (PHS* Personal Handyphone System) function.

As shown in FIG. 1, the information processing terminal 100 comprises a relatively thin first housing 10 and a relatively thick second housing 20. The second housing 20 is pivotally supported by a hinge 30 at one end of the first housing 10.

The first housing 10 has a form factor of Type-II defined by PCMCIA/JEIDA (5 mm×85.6 mm×54.0 mm) and is provided at the other end thereof with a PCMCIA connector 11 (68 pins configuration) for electrical connection to an external computer system (not shown). Incidentally, an example of an external computer system which can accommodate the information processing terminal 100 of this embodiment may be a personal computer having a PC card slot and conforming to the OADG (Open Architecture Developer's Group) specification. The first housing 10 can be entirely inserted into the card slot provided on the outer wall of the personal computer.

A keyboard 12 having a plurality of key pads is provided on the top surface of the first housing. Provided in the keyboard 12 are cursor key and a power switch beside the ten keys and function keys as well as a key input control circuit for generating a scan code corresponding to a key input. The key board 12 acts as an input means for the PDA function and is also used for phone number input as well as switching operational modes when used as a PHS. The top surface portion of a microphone 13 for a voice input is exposed on the top surface. The microphone 13 is used when talking as a PHS.

On the other hand, the second housing is a module which can not be inserted into the PC card slot, so that it may be formed in a size thicker than the form factor defined by PCMCIA/JEIDA. In the information processing terminal 100 of this embodiment, most of components which implement each of the PDA and the PHS functions are contained within the second housing.

A liquid crystal display 21 is provided on the surface of the second housing as an output means of the PDA function. The display 21 has a relatively large screen of 200×320 dots resolution in this embodiment. A processed data is displayed on the display 21 (e.g., a PIM data or a Web page downloaded from the PC and a contents of an electronic mail received by the PHS part, etc.).

The edge portion of the second housing 20 is shaped substantially into a semi-cylinder. A speaker 22 for voice output is provided on the top surface of the semi-cylinder portion. An antenna 23 for wireless transmission/reception is also provided so as to extend from and retract to the edge on the left side edge of the second housing.

Figure 2:
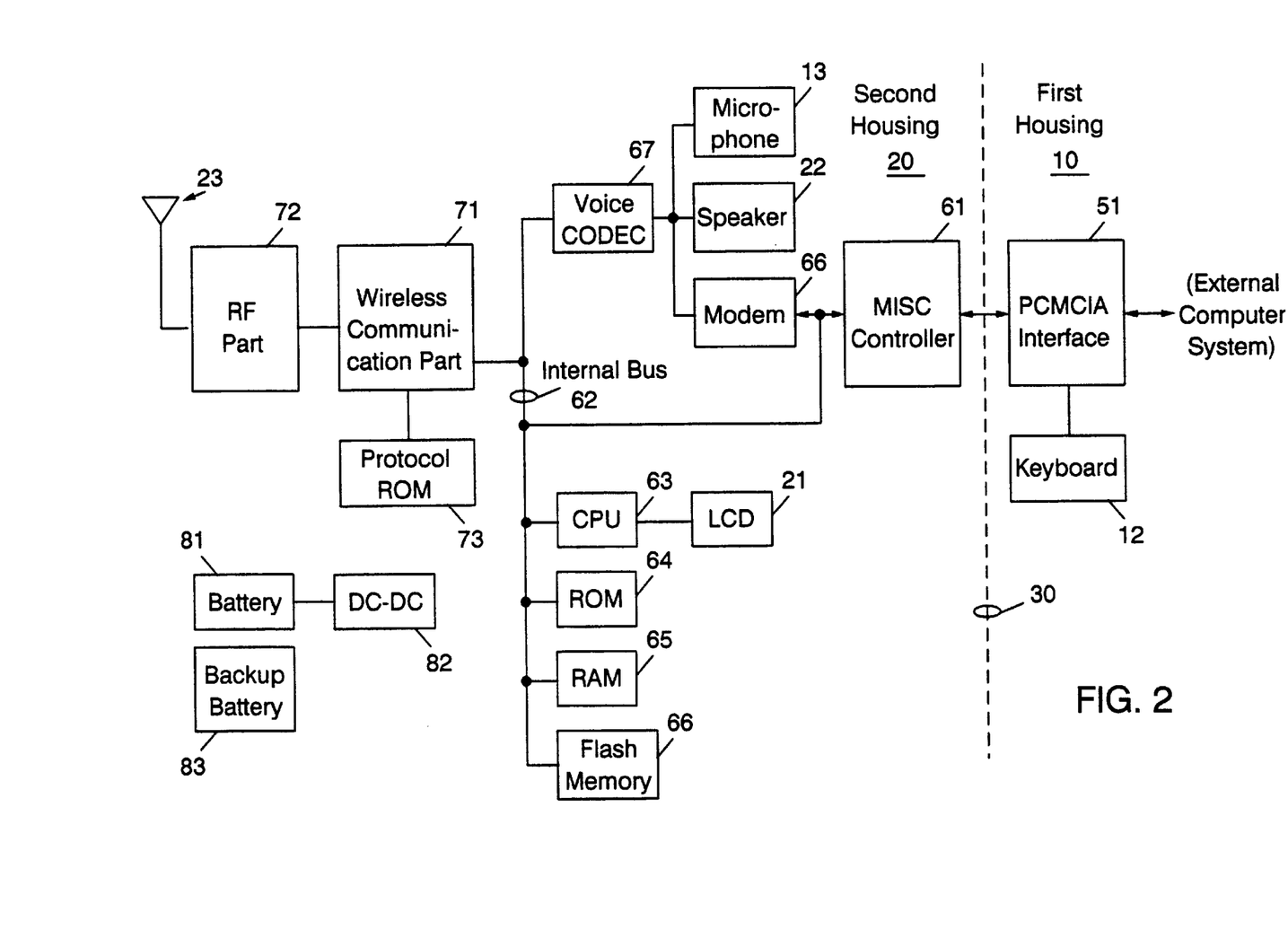
FIG. 2 schematically shows the internal hardware configuration of the information processing terminal 100 of a foldable structure embodying this invention.

FIG. 2 schematically shows an example of internal components of the information processing terminal 100.

It should be understood in this figure that the dotted line crossing near the center implies the hinge 30 with the right side thereof corresponding to components in the first housing while the left side thereof corresponding to components in the second housing.

A PCMCIA interface 51 and the keyboard 12 are mounted in the first housing 10.

The PCMCIA interface 51 in this embodiment includes not only a function for implementing the interface protocol to the connected external computer system but also a function for reducing the bit width by multiplexing the address bus and the data bus in the PCMCIA bus as well as a function for generating a scan code in accordance with the key input on the keyboard. The detail will be described later in this specification.

On the other hand, both components for the PDA function to mainly process computer data and components for the PHS function to implement wireless communication are contained within the second housing 20. It should be understood in FIG. 2 that the shaded hardware blocks are components which are customized to wireless communication function.

A MISC controller 61 is a circuit for interfacing with the first housing part and provided with a function to develop on the internal bus 62 the received bus signal in which the address bus and the data bus are multiplexed (to be described later). The MISC controller 61 also includes a function to consolidate various operations in the second housing, which will not be described further in this specification because they are not directly related to this invention.

Each component is interconnected on the internal bus 62. Among them, a CPU 63 is a main controller for consolidating the PDA functions of the information processing terminal 100. The CPU 63 also controls the display 21. As the CPU 63 in this embodiment, 16-bit CPU "TLCS900L" made by Toshiba is available.

A ROM 64 is a read only memory for permanently storing codes for controlling the hardware operations in the terminal 100. A RAM 65 is a writable volatile memory mainly used as a working area of the CPU 63. A flash memory 66 is an erasable non-volatile memory used for retaining, for example, a security data of the terminal 100.

A voice CODEC 67 is a circuit dedicated to compress and expand a voice data. A voice data inputted through the microphone 13 is taken into the terminal 100 after it is compressed by the voice CODEC 67. The voice data which is expanded by the voice CODEC 67 is outputted as a voice by the speaker 22.

A modem 66 is a circuit dedicated to modulate a computer data into a transmittable form and, conversely, demodulate a received transmission data into a computer data. For example, a computer data received from the external computer system through the PCMCIA interface 51 and the MISC controller 61 is modulated by the modem 66 and compressed by the voice CODEC 67 for wireless transmission. A received electronic mail is demodulated in the modem 66 and then processed by the internal CPU 63 or the connected external computer system.

A wireless communication part 71 is a main controller which controls the PHS function of the terminal 100. The wireless communication part 71 also supports functions of PHS telephone such as call by phone directory, redial, call history, dial lock, notification of calling number and absence response service, etc. A protocol ROM 73 connected to the wireless communication part 71 stores therein a control code which conforms to a predetermined communication system which varies generally from carrier to carrier (e.g., ASTEL or DDI pocket).

An RF part 72 is a circuit dedicated to the input/output operation of wireless data through the antenna 23. The RF part 72 outputs a sending digital data delivered from the wireless communication part 71 as a wireless data and, conversely, takes in a wireless data received through the antenna 23 into the terminal 100.

The terminal 100 is provided with a battery 81 as a main power source. A secondary cell such as a lithium ion cell is employed as the battery 81. The output terminal voltage of the battery 81 is level converted by a DC—DC converter 82 for supply to each component. A backup battery 83 is also equipped.

Many other electrical circuits are required beyond those shown in FIG. 1 for configuring the information processing terminal 100 which implements both the PDA and the PHS functions. However, these circuits are well known to those skilled in the art and not a part of this invention so that they are omitted from this specification. It should be also understood that only a part of connections among the hardware blocks in the figure is shown in order to avoid complication of the figure.

Figure 3:
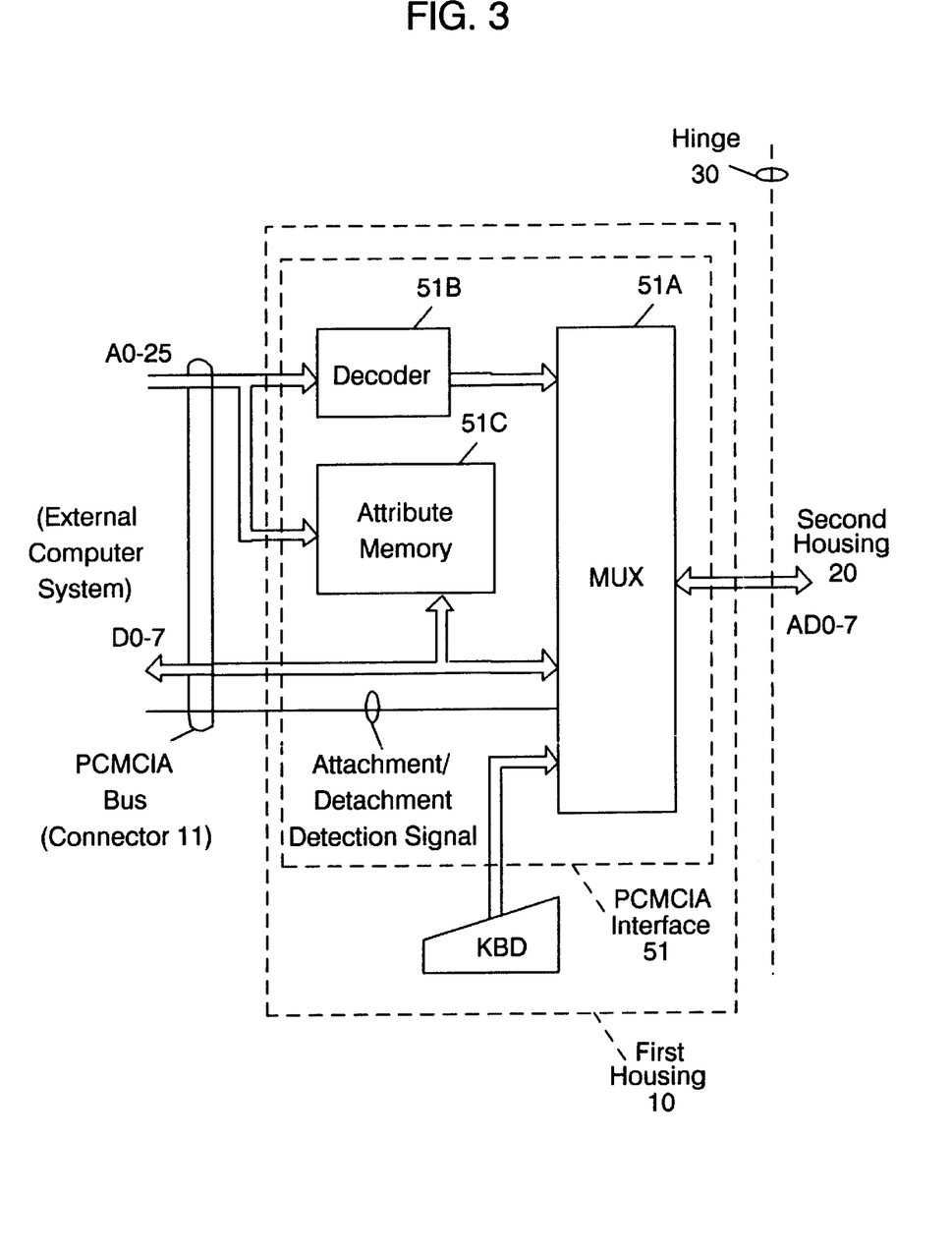
FIG. 3 shows the internal configuration of the PCMCIA interface 51 in accordance with the present invention.

FIG. 3 shows an example of a further detail of the internal configuration of the PCMCIA interface 51. The PCMCIA interface 51 may be manufactured by ASIC technique (Application Specific IC). As shown in FIG. 3, the PCMCIA interface 51 comprises a multiplexing circuit 51A, an address decoder 51B and an attribute memory 51C.

The PCMCIA interface 51 is interconnected to the external computer system through the PCMCIA bus (card connector 11). Each signal line of the PCMCIA bus is defined by PCMCIA/JEIDA and includes an address bus A0-25 of 26-bit width and a data bus D0-7 of 8-bit width. Among the signals, the attachment/detachment detection signal is a signal which notifies of whether or not the first housing is inserted into the card slot of the external computer system. In this embodiment, the feed line from the external computer system is also used as the attachment/detachment detection signal. The attachment/detachment to the card slot is detected by the level of this signal.

The address decoder 51B converts the 26-bit width address bus A0-25 in the PCMCIA bus to 8-bit width address bus A0-7 used to address the memory space in the information processing terminal 100. An indexing method is for example used for conversion of the bus width (to be described later).

The attribute memory 51C is a memory for storing an attribute information of the card which is necessary for the information processing terminal 100 to be used as a PC card. The attribute memory 51C is accessible by the external computer system in accordance with a conventional I/O access procedure.

The multiplexing circuit 51A is a circuit for multiplexing the data bus D0-7 in the PCMCIA bus and the 8-bit width address bus A0-7 output by the decoder 51B into AD0-7 and, conversely, for de-multiplexing AD0-7 into the original address and data buses. The multiplexing circuit 51A also has as an input the scan code generated by the key input in the keyboard 12. The multiplexing circuit 51A is cable connected to the MISC controller 61 in the second housing 20 through the hinge 30.

The multiplexing circuit 51A is also provided with a function for switching the definition of each signal line in the cable connecting to the MISC controller 61 in accordance with the status of attachment to the external computer system. In other words, the multiplexing circuit 51A detects the status of attachment to the external computer system by the attachment/detachment detection signal for switching the definition of each signal in the cable as shown in the table 1 below. This is required because the PCMCIA bus transaction has to be transmitted to the second housing 20 while the use of the keyboard is disabled when the first housing 10 is attached to the external computer system; on the other hand, the scan code resulted from a key input has to be processed while the PCMCIA bus is not used when the first housing 10 is detached from the external computer system.

| No. | Sense | Keyboard Attached | PCMCIA Connected |
| --- | --- | --- | --- |
| 1 | Output | PCMCIA_IRQ | PCMCIA_{IRQ} |
| 2 | Output | KBD_IRQ | #RD |
| 3 | Output | SCAN_OUT_CODE0 | #WR |
| 4 | Input/Output | SCAN_OUT_CODE1 | AD0 |
| 5 | Input/Output | SCAN_OUT_CODE2 | AD1 |
| 6 | Input/Output | KBD_CUT0 | AD2 |
| 7 | Input/Output | KBD_OUT1 | AD3 |
| 8 | Input/Output | — | AD4 |
| 9 | Input/Output | — | AD5 |
| 10 | Input/Output | — | AD6 |
| 11 | Input/Output | — | AD7 |

While the PCMCIA bus consists of about 70 signal lines, the number of signal lines of the cable connecting the housings 10 and 20 is reduced to 11 in the information processing terminal 100 of this embodiment. It should be fully understood that the number of signal lines of the cable connecting the housings 10 and the housing 20 is largely reduced by multiplexing the address and the data buses and by switching between the address/data buses and the scan code signals. It will be understood that the manufacturing cost can be reduced in accordance with the number of signal lines comprising the cable.

Figure 4:
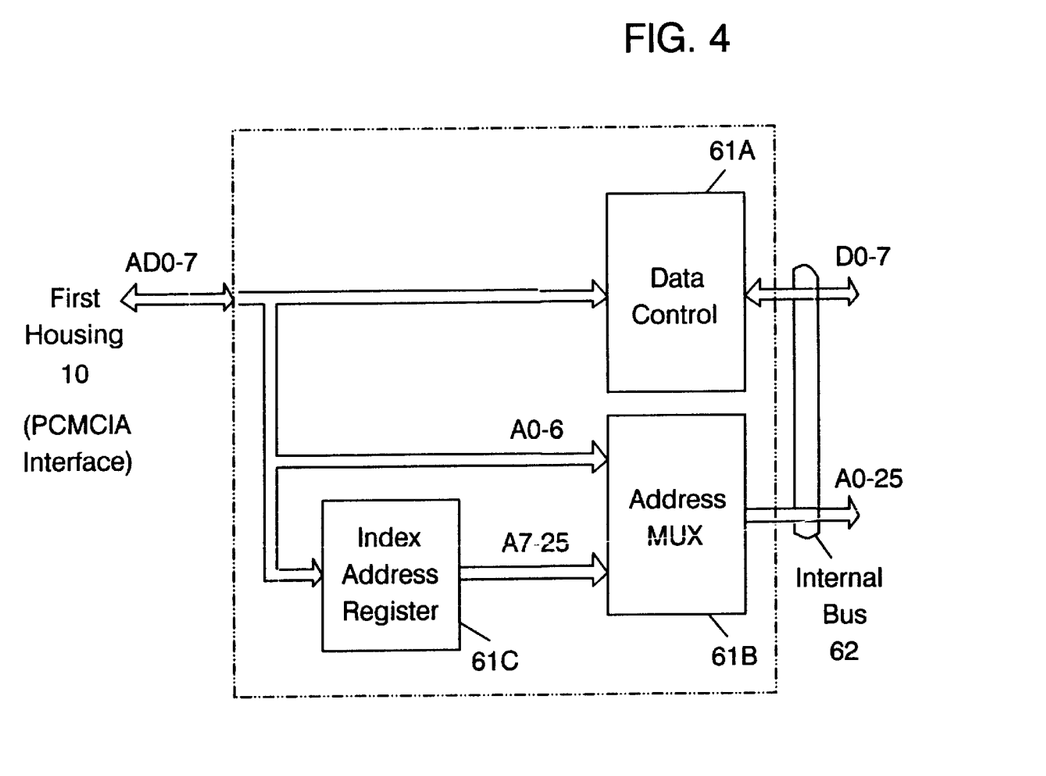
FIG. 4 illustrates only the interface mechanism portion extracted of the MISC controller 61 in the second housing 20 in accordance with the present invention.

The signal lines coming in and out of the multiplexing circuit 51A are connected to the MISC controller 61 in the second housing 20. The MISC controller 61 may be manufactured by, for example, the ASIC (Application Specific IC) technique. FIG. 4 illustrates only an example of an interface component portions extracted of the MISC controller 61 in the second housing 20.

The data portion D0-7 of the multiplexed address signal and the data signal is connected to the data bus in the internal bus 62 through a data control mechanism 61A.

The lower 7 bits A0-6 of the address portion lead to an address multiplexing circuit 61B as they are. The most significant bit A7 of the address portion leads to an index address register 61C.

The register 61C is a circuit for generating an offset value of the address in accordance with the value of the most significant bit A7. In this embodiment, the index address register 61C comprises 3 offset registers as shown in an example of FIG. 5. An offset values is written in advance in each of the register 1, 2 and 3.

Figure 5:
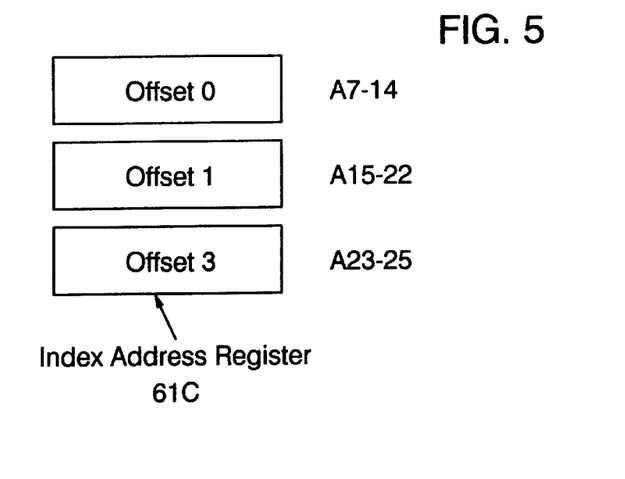
FIG. 5 schematically shows the internal configuration of the index address register 61 in accordance with the present invention.

When A7=1, each register is adapted to give an offset value of A7–14, A15–22 and A23–25, respectively.

The address multiplexing circuit 61B is a circuit for multiplexing the lower 7 bits address A0-6 and each offset value given by the index address register 61C to generate 26 bits address bus A0-25. The address bus A0-25 sent out from the multiplexing circuit 61B comprises a part of the internal bus 62 in the second housing 20 together with the data bus D0-7.

While this invention has been described in detail with reference to a specific embodiment, it should however be understood that modifications and alternations of the embodiment are obvious to those skilled in the art without departing the spirit of this invention. In other words, this invention is disclosed in the form of exemplary embodiment and should in no way be interpreted in a limited way.

As described in detail in the above, an improved information processing terminal is provided according to this invention which is provided with a first housing having a form factor defined by PCMCIA/JEIDA and a second housing pivotally coupled to the first housing.

Also according to this invention, an improved information processing terminal is provided which is provided with a first housing having a form factor defined by PCMCIA/JEIDA and a second housing pivotally coupled to the first housing with enhanced reliability of a cable passing through the coupling portion of the housings.

Also according to this invention, an improved information processing terminal is provided which is provided with a first housing having a form factor defined by PCMCIA/JEIDA and a second housing pivotally coupled to the first housing with reduced number of signal lines of the cable passing through the coupling portion of the housings, thereby realizing reduction of manufacturing cost.

Also according to this invention, an improved information processing terminal is provided with a first housing having a form factor defined by PCMCIA/JEIDA and a second housing pivotally coupled to the first housing and wherein a high function keyboard may be mounted in the first housing.

It is noted that this invention may be used for many applications, in many structures and forms. Although the description is made for particular arrangements and applications, such as PCMCIA, JEIDA, etc., and described in regard to usage for a PC, the intent and concept of the invention is suitable and applicable to other arrangements and applications, structures and forms. It will be clear to those skilled in the art that other modifications to the disclosed embodiments can be effected without departing from the spirit and scope of the invention.

What is claimed is:

1. An information processing terminal for detachably attaching to an external computer system comprising:
   a first housing member dimensioned to be attachable to a standard confirming recessed connecting portion of said external computer system said first housing member having a standard conforming interface for communication to the external computer;
   a second thicker housing member pivotally hinged on one end of said first housing member which second housing member does not conform to the interface standard for insertion into the recessed connection portion;
   a key imput means and microphone contained within said first housing member;
   a data processing part contained within said second housing member;
   a display means and a speaker and other elements needed for aural wireless telephone communication provided within said second housing member;
   a connect/disconnect switch for indicating whether the first housing member is electrically connected to the external computer; and
   a transmission means for transmitting multiplexed signals between said first and said second housings said interface being responsive to said connect/disconnect switch to select between input signals from the key input means and those signals transmitted over the standard conforming interface between the first housing and the external computer.

2. An information processing terminal for detachably attaching to an external computer system comprising:
   a first housing member attachable to a recessed connecting portion of said external computer system;
   a bus connector part provided on one end of said first housing for electrical connection to said recessed connection portion;
   a second housing member pivotally hinged on the other end of said first housing member;
   a key imput means contained within said first housing member;
   a display means provided within said second housing member;
   a connect/disconnect switch indicating whether the first housing member is electrically connected to the external computer system;
   a multyplexing means for electrically connecting the first and the second housing members said multiplexing means being responsive to the connect/disconnect switch to seclect between input signals entered through the key imput means and those signals passing through the bus connector part;
   a wireless communication means contained within said second housing member; and
   an antenna attached to said second housing member.

3. The information processing terminal of claim 2 in which said data processing part comprises a processor unit for arithmetic processing of data and a memory for storing a program and data.

4. The information processing terminal of claim 2 in which said multiplexing circuit multiplexes the address bus and the data bus in the PCMCIA bus.

5. The information processing terminal of claim 2 in which a wireless communication means is integrated in said second housing member with a microphone in the first housing member.

6. An information processing terminal for detachably attaching to an external computer system comprising:
   a first housing member having a form factor defined by PCMCIA/JEIDA,
   a key entry device in the first housing member;
   a PCMCIA connector provided on one end of said first housing member for sending and receiving a PCMCIA bus signal in a form not multiplexing each bus signal line;
   a second housing member having a form facto not conforming to PCMCIA/JEIDA standards pivotally hinged on the other end of said first housing member;
   a connect/disconnect switch for indicating whether or not the first housing member is electrically connected to the external computer;
   a PCMCIA interface contained within said first housing member having a multiplexing circuit having a bus into which at least a part of the bus signal lines of said PCMCIA bus are multiplexed, said multiplexing circuit being responsive to the connect and desconnect switch to seclect between signals from the key entry device when the first housing member and the external computer are disconnected;

a cable for transmitting between said first and said second housing members the multiplexing circuit bus into which at least a part of the bus signal lines from the PCMCIA bus are multiplexed; and a data processing part contained within said second housing member for processing data exchanged through said cable.

7. The information processing terminal of claim 6 in which said data processing part comprised a processor unit for arithmetic processing of data and a memory for storing a program and data.

8. The information processing terminal of claim 6 in which said multiplexing circuit multiplexes the address bus and the data bus in the PCMCIA bus.

9. The information processing terminal of claim 6 in which said PCMCIA interface contains an address decoder for converting the address bus in said PCMCIA bus to such a bit width that may be able to address the memory space in said data processing part.

10. The information processing terminal of claim 6 in which said second housing has an index for correlating the address specified on said PCMCIA bus to the address on the memory space in said data processing part.

11. The information processing terminal of claim 6 in which said PCMCIA interface contains an attribute memory for storing an attribute information as a PC card.

12. The information processing terminal of claim 6 in which a wireless communication means is integrated in said second housing member.

13. The information processing terminal of claim 6 in which said data processing part comprises a processor
   unit for arithmetic processing of data and a memory for storing a program and data.

14. An information processing terminal detachably attached to an external computer system comprising:

a first housing member having a form factor defined by PCMCIA/JEIDA;

a PCMCIA connector provided on one end of said first housing member for sending and receiving a PCMCIA bus signal in a form not multiplexing each bus signal line; a second housing member pivotally hinged on the other end of said first housing;

a PCMCIA interface contained within said first housing member having a multiplexing circuit for generating a bus into which at least a part of bus signal lines of said PCMCIA bus are multiplexed;

a key input means provided on the top surface of said first housing member;

a key input control circuit contained within said first housing member for generating a scan code in response to a key input operation by said key input means;

a cable for electrically connecting said first and said second housing members;

a signal switching means contained within said first housing member for selectively transmitting either one of said multiplexed bus signal and said scan code signal;

a data processing part contained within said second housing member for processing data exchanged through said cable; and a display provided in the front surface of said second housing member for displaying processed data.

15. The information processing terminal of claim 14 in which said data processing part comprises a processor unit for arithmetic processing of data and a memory for storing a program and data.

16. The information processing terminal of claim 14 in which said PCMCIA interface contains an address decoder for converting the address bus in said PCMCIA bus to such a bit width that may be able to address the memory space in said data processing part.

17. The information processing terminal of claim 14 in which a wireless communication means is integrated in said second housing member with a microphone in the first housing member.

18. An information processing terminal detachably attached to an external computer system comprising:

a first housing member having a form factor defined by PCMCIA/JEIDA;

a PCMCIA connector provided on one end of said first housing member for sending and receiving a PCMCIA bus signal in a form not multiplexing each bus signal line;

a second housing member pivotally hinged on the other end of said first housing member;

a PCMCIA interface contained within said first housing member having a multiplexing circuit for generating a bus into which at least a part of bus signal lines of said PCMCIA bus are multiplexed;

a key input means provided on the top surface of said first housing member;

a key input control circuit contained within said first housing member for generating a scan code in response to a key input operation by said key input means;

a cable for electrically connecting said first and said second housing members;

an attachment/detachment detection means for detecting whether or not said PCMCIA connector is electrically connected to an external computer system;

a signal switching means for transmitting said multiplexed bus to said cable in response to said PCMCIA connector being connected to an external computer system and for transmitting said scan code signal in response to said PCMCIA connector not being connected to any external computer system over said cable;

a data processing part contained within said second housing member for processing data exchanged through said cable; and a display provided on the front surface of said second housing member for displaying processed data.

19. The information processing terminal of claim 18 in which said data processing part comprises a processor unit for arithmetic processing of data and a memory for storing a program and data.

20. The information processing terminal of claim 18 in which said PCMCIA interface contains an attribute memory for storing an attribute information as a PC card.

21. The information processing terminal of claim 18 in which a wireless communication means is integrated in said second housing member.

22. An information processing terminal for detachably attaching to an external computer system comprising:

a first housing member attachable to a recessed connecting portion of said external computer system for transmission of signals therebetween;

a larger second housing member electrically connected to said first housing member, which second housing member is unable to fit the recessed connection portion;

connect/desconnect means for determining if the first housing member is electrically connected to the external computer;

a key input means contained within said first housing member;

a data processing part contained within said second housing a transmission means for transmitting a signal between said first and said second housing for transmitting a signal between said first and said second housing members, said transmission means being responsive to the connect/disconnect means to selectively transmit one or the other of input signals from the key input means or those between the first housing member and the external computer system.

23. An information processing terminal for detachably attaching to an external computer system comprising:

a first housing member attachable to a recessed connecting portion of said external computer system;

a bus connector part provided on one end of said first housing member for electrical connection to said recessed connection portion;

a pivotable second housing member electrically connected to said first housing member;

a key imput means contained within said first housing member;

a data processing part contained within said second housing member;

a display means provided within said second housing member; and a transmission means for electrically connection the first and the second housing members in a form different from said bus connector part said transmission means having less connections than said bus connector part and transmitting multiplexed signals from the bus connector part or key input signals depending on whether bus connector is electrically connected to the external computer system.

24. An information processing terminal for detachably attaching to an external computer system comprising:

a first housing member attachable to a recessed connecting portion of said external computer system;

a bus connector part provided on one end of said first housing member for electrical connection to said recessed connecting portion;

a larger second housing member incapable of insertion into the recessed connection portion electrically connected to said first housing member;

a key input means and a microphone contained within said first housing member;

a data processing part contained within said second housing member;

a display means provided within said second housing member;

a transmission means for electrically connection the first and second housing members in a form different from said bus connector part said transmission means providing in the alternative multiplexed signals from the external computer system or signals from the key imput means;

a wireless communication means contained within said second housing member; and an antenna attached to said second housing member.

25. An information processing terminal for detachably attaching to an external computer system comprising:

a first housing member having a form factor defined by PCMCIA/JEIDA, a PCMCIA connector provided on one end of said first housing member for sending and receiving a PCMCIA bus signal from the external computer system in a form not multiplexing each bus signal line;

a data input mechanism in the first housing member for providing data when the information processing terminal is not attached to the external computer system;

a larger second housing member which does not have a form factor defined by PCMCIA/JEIDA standards electrically connected to said first housing member;

a PCMCIA interface contained within said first housing member having a multiplexing circuit for generating a bus into which at least a part of bus signal lines of said PCMCIA bus are multiplexed which PCMCIA interface is responsive to the attachment and detachment of the information terminal from the external computer to seclect between signals from the data input mechanism and those on the bus signal lines;

a cable for transmitting between said first and said second housing members said bus into which at least a part of bus signal lines are multiplexed; and a data processing part contained within said second housing member for processing data exchanged through said cable.

26. An information processing terminal detachably attached to an external computer system comprising:

a first housing member having a form factor defined by PCMCIA/JEIDA;

a PCMCIA connector provided on one end of said first housing for sending and receiving a PCMCIA bus signal in a form not multiplexing each bus signal line;

a second housing member electrically connected to said first housing member;

a PCMCIA interface contained within said first housing member having a multiplexing circuit for generating a bus into which at least a part of bus signal lines of said PCMCIA bus are multiplexed;

a key input means provided on the top surface of said first housing member;

a key input control circuit contained within said first housing member for generating a scan code in response to a key input operation by said key input means;

a cable for electrically connecting said first and said second housing members;

a signal switching means contained within said first housing member for selectively transmitting either one of said multiplexed bus signal and said scan code signal;

a data processing part contained within said second housing member for processing data exchanged through said cable; and a display provided on the front surface of said second housing member for displaying processed data.

27. An information processing terminal detachably attached to an external computer system comprising:

a first housing member having a form factor defined by PCMCIA/JEIDA;

a PCMCIA connector provided on one end of said first housing member for sending and receiving a PCMCIA bus signal in a form not multiplexing each bus signal line;

a second housing member electrically connected to said first housing member;

a PCMCIA interface contained within said first housing member having a multiplexing circuit for generating a bus into which at least a part of bus signal lines of said PCMCIA bus are multiplexed;

a key input means provided on the top surface of said first housing member;

a key input control circuit contained within said first housing member for generating a scan code in response to a key input operation by said key input means;

a cable for electrically connecting said first and said second housing members;

an attachment/detachment detection means for detecting whether or not said PCMCIA connector is electrically connected to an external computer system;

a signal switching means for transmitting said multiplexed bus to said cable in response to said PCMCIA connector being connected to an external computer system and for transmitting said scan code signal in response to said PCMCIA connector not being connected to any external computer system over said cable;

a data processing part contained within said second housing member for processing data exchanged through said cable; and display provided on the front surface of said second housing member for displaying processed data.

* * * * *